United States Patent [19]

Perry

[11] Patent Number: 4,534,027
[45] Date of Patent: Aug. 6, 1985

[54] DUPLEX DIGITAL SPAN CONVERSION CIRCUIT ARRANGEMENT

[75] Inventor: Thomas J. Perry, Phoenix, Ariz.

[73] Assignee: GTE Automatic Electric Incorporated, Northlake, Ill.

[21] Appl. No.: 506,490

[22] Filed: Jun. 22, 1983

[51] Int. Cl.³ ............................................. G06F 11/20
[52] U.S. Cl. .................................. 371/8; 179/18 EE; 370/16
[58] Field of Search .................. 371/8, 9, 68; 370/16; 179/18 EE

[56] References Cited

U.S. PATENT DOCUMENTS

| | | | |
|---|---|---|---|
| 3,909,542 | 9/1975 | Wunluck et al. | 179/18 EE |
| 4,011,542 | 3/1977 | Baichtal et al. | 371/8 X |
| 4,144,407 | 3/1979 | Zaffignani et al. | 179/18 ES |
| 4,254,496 | 3/1981 | Munter | 370/16 |
| 4,382,294 | 5/1983 | Beuscher et al. | 370/16 |
| 4,413,335 | 11/1983 | Clements et al. | 370/16 |

OTHER PUBLICATIONS

W. N. Toy, Fault-Tolerant Design of Local ESS Processors, Proc. of the IEEE, vol. 66, No. 10, Oct. 1978, pp. 1126–1145.

R. J. Willett, Design of Recovery Strategies for a Fault-Tolerant No. 4 Electronic Switching System, The Bell System Tech. Journal, vol. 64, No. 10, Dec. 1982, pp. 3019–3041.

Primary Examiner—Charles E. Atkinson
Attorney, Agent, or Firm—Frank J. Bogacz; Peter Xiarhos

[57] ABSTRACT

In a telecommunications switching system, a thick film digital span conversion circuit is connected between a digital span and a switching network of the switching system. The circuit converts data, which is encoded for digital span use, to TTL logic coding for use by the switching network. The telecommunications switching system provides for duplicated data transmission through the switching network. Duplicated conversion circuits are employed in an active/standby configuration under CPU control. On-line replacement of a fault conversion circuit may be performed without a switching service interruption.

14 Claims, 6 Drawing Figures

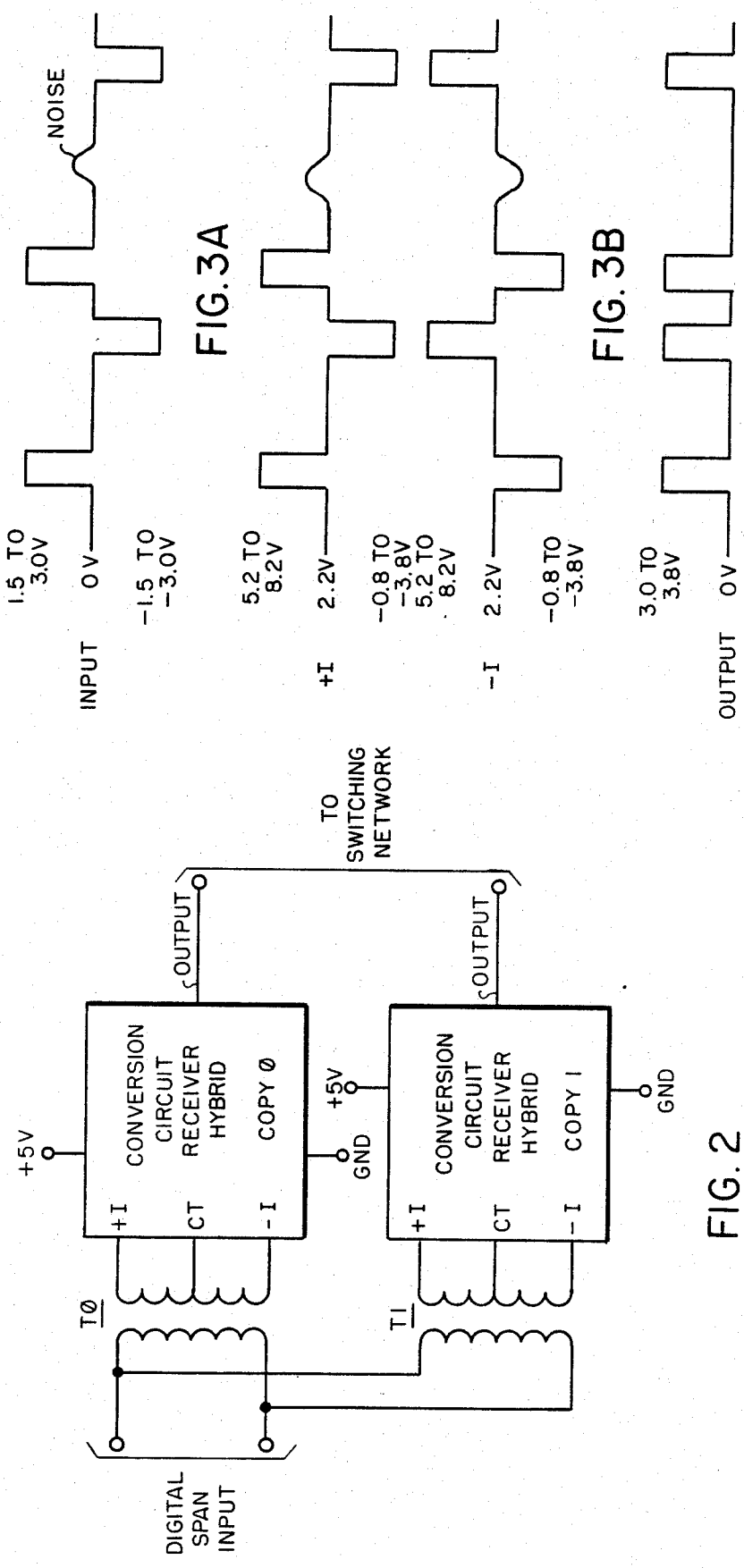

DUPLEX DIGITAL SPAN CONVERSION CIRCUIT ARRANGEMENT

BACKGROUND OF THE INVENTION

The present invention pertains to digital span data conversion circuitry and more particularly to a fault tolerant conversion circuit switching arrangement for use with a switching network in a CPU controlled telecommunications switching system.

Typically, circuits for converting digital span data to data compatible with use by modern switching networks is implemented using discrete components. These circuits are large in size and consume a relatively large amount of power.

Public policy requires that a telecommunications switching system provide virtually uninterrupted service to the public over long periods of time. Simple solutions to this problem include duplication of circuitry. Given the background of the present technology as being discrete components, as mentioned above, duplication of circuitry will lead to more size requirements and power consumption.

Accordingly, it is the object of the present invention to provide a fault tolerant conversion circuit for translating digital span data to data compatible with a switching network of a telecommunications switching system which is small in size and requires a small amount of power.

SUMMARY OF THE INVENTION

In a telecommunications switching system, a conversion circuit arrangement is connected between a plurality of digital spans and a switching network of the switching system. Digital span data is transmitted to the conversion circuit arrangement via the digital span. The conversion circuit arrangement has first and second conversion circuit copies. These circuit copies operate to convert the digital span data to data compatible with the switching network.

Each digital span is connected to a first and to a second copy of one particular conversion circuit. Each digital span is connected to a distinct set of first and second copies of conversion circuits. A central processing unit is connected to each of the first and second copies of the conversion circuit arrangement. The central processing unit (CPU) may selectively enable either the first copy of the conversion circuit to actively receive data from the connected digital span or the CPU may selectively enable the second copy of the conversion circuit to actively receive the digital span data from the connected digital span. When the first copy of the conversion circuit is receiving data, the second copy is a ready/standby mode of operation. Similarly, when the second copy is actively receiving data the first copy is in the ready/standby mode of operation.

Initially, the CPU selects either the first or second copy of the conversion circuit as the active copy. When the CPU detects a fault in the active copy, it instantaneously operates the first and second copies, so that the copy that was in the ready/standby mode of operation becomes active and the previously active copy is placed on standby so that the circuit may be removed and repaired without impairing switching system operation and service to its customers.

BRIEF DESCRIPTION OF THE DRAWING

FIG. 2 is a block diagram of the conversion circuit receiver hybrid and associated transformer in duplicated configuration.

FIG. 3, comprised of FIGS. 3A, 3B and 3C, shows a series of waveform diagrams depicting the conversion process.

DESCRIPTION OF THE PREFERRED EMBODIMENT

Figure 1:
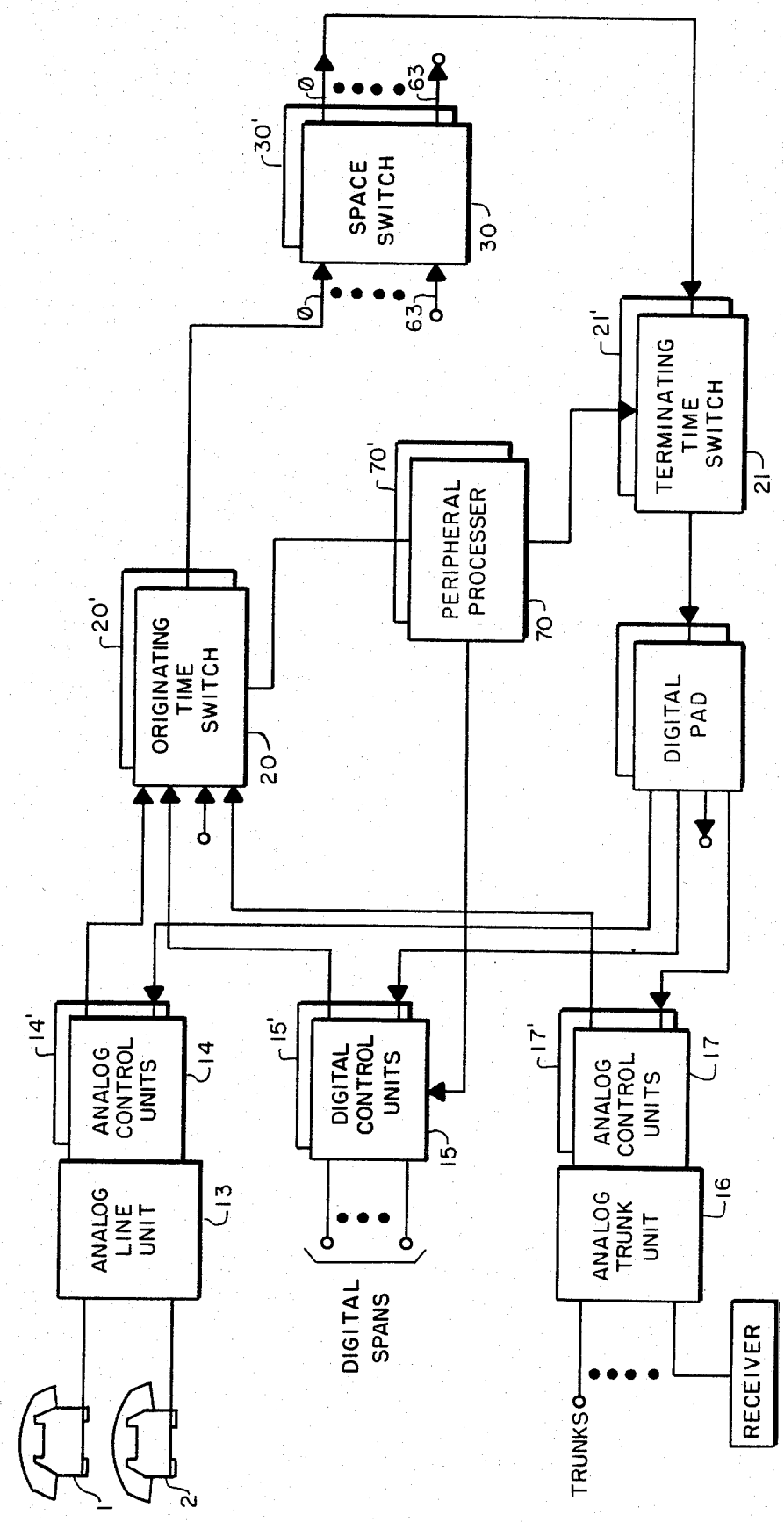
FIG. 1 is a block diagram of a telecommunications switch system embodying the present invention.

Referring to FIG. 1, a time-space-time digital switching network along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to duplex pair of space switch units 30 and 30' which are in turn connected to the terminating time switch 21 and 21'. Time switch and control units 21 and 21' are connected to analog control unit 14 and 14' and ultimately to the telephone subscribers 1 and 2 via analog line circuit 13.

Digital control units 15 and 15' connect the digital spans to the switching network. Digital span equipment may be implemented using a model 9004 T1 digital span manufactured by GTE Lenkurt Inc. Similarly, analog trunk unit 16 connects trunk circuits to the digital switching network via analog control units 17 and 17'.

A peripheral processor CPU 70 controls the digital switching network and digital and analog control units. Analog line unit 13 and a duplex pair of analog control units 14 and 14' interface to telephone subscribers directly. A duplicate pair of digital control units 15 and 15' control the incoming PCM data from the digital spans. Similarly, the analog trunk unit 16 and a duplex pair of analog control units 17 and 17' interface to trunk circuits. The analog and digital control units are each duplicated for reliability purposes.

Referring to FIG. 2, conversion circuit receiver hybrid copy 0 and copy 1 are located in digital control units (DCUs) 15 and 15', respectively. These conversion circuit hybrids provide a duplex link between each digital span, which employs the DS1 signaling mode, and the switching network, which uses TTL compatible logic levels.

Each duplex pair of DCUs may handle up to 8 digital spans. A DCU may handle all 8 digital spans for a fault condition in the other DCU of the duplex pair. The switching office may contain many DCU pairs.

It is to be noted that although the circuitry set forth herein is described using the DS1 formats for use with T1 spans, signaling formats DS2 and DS3 for use with T2 and T1C spans, respectively, may also be processed by the circuitry with only minimal changes in the peripheral processor to software.

Each conversion circuit hybrid receiver, copy 0 and copy 1, is connected to a particular digital span via transformers T0 and T1, respectively. Each conversion circuit is a thick film hybrid.

FIG. 3A shows a typical input waveform that would appear at the input of the transformer. FIG. 3B shows the waveforms which would appear at the transformer outputs (+I and −I) for this same typical input waveform that was shown in FIG. 3A. FIG. 3C shows the output produced by the conversion circuit receiver hybrid. Every pulse at the input causes a pulse of the same width at the output. It is important that the width of the output pulse be about the same as that of the input.

Input pulses which are less than one-half the amplitude of the peak input pulse level should be treated as noise and cause no output disturbance, whereas input pulses which are greater than one-half the normal peak input pulse level should be treated as true pulses and should cause a corresponding output pulse.

Figure 4:
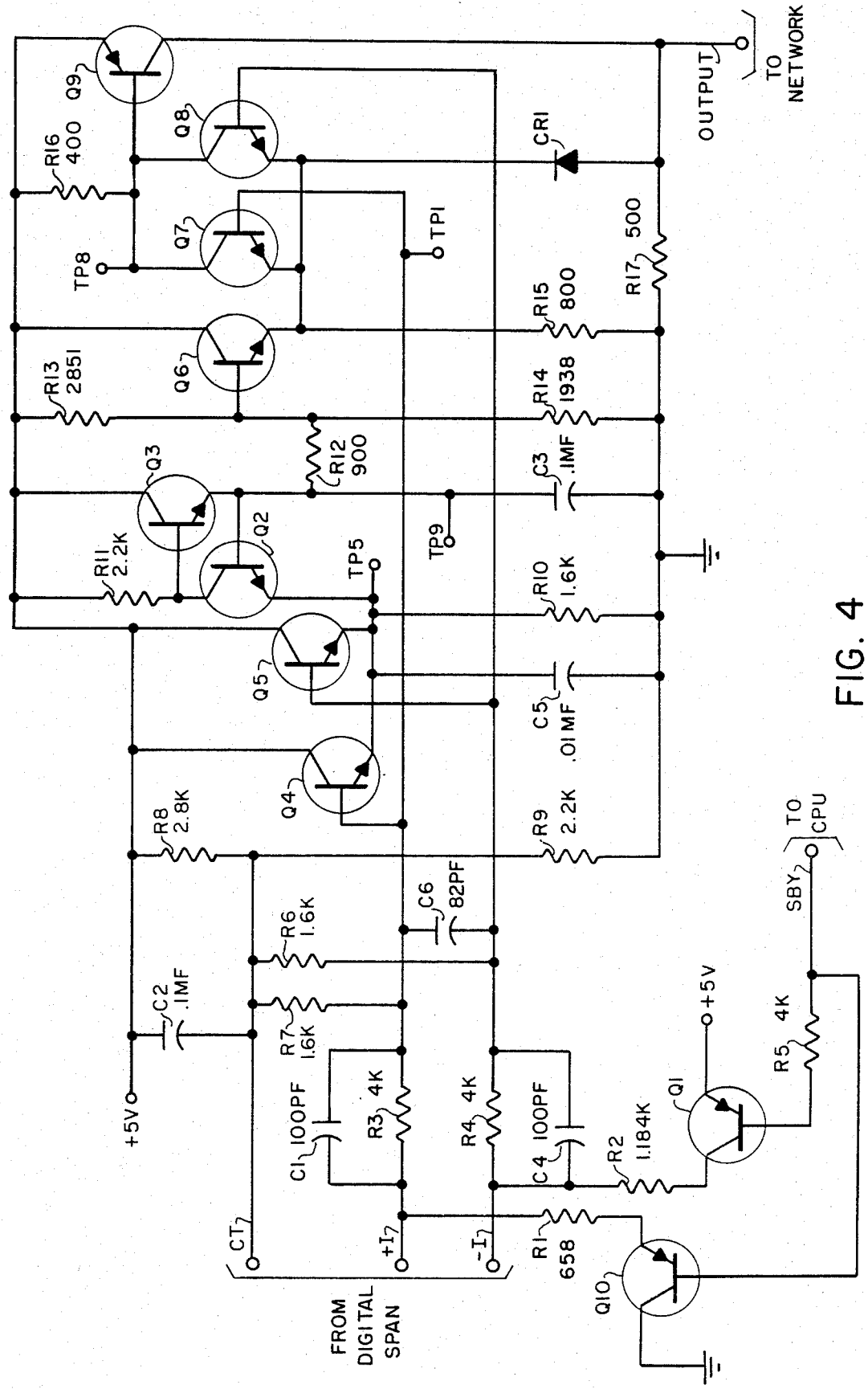
FIG. 4 is a schematic diagram of each conversion circuit receiver hybrid.

Referring to FIG. 4, each copy of the hybrid conversion circuit may be divided into seven functional units as follows:

(1) Input impedance control including resistors R1, R2, R5, and transistors Q1 and Q10. Under control of the SBY lead connected to peripheral processor 70, the input impedance of the hybrid circuit is varied. When SBY is high, the input impedance is about 3K ohms; when SBY is low, the input impedance is about 600 ohms.

(2) A compensation network includes resistors R3, R4, R5, R7, and capacitors C1, C4, and C6. This network attenuates the input signals on the +I and −I leads, so that the peak detector and comparator inputs are not overdriven.

(3) A bias network includes resistors of R8 and R9, and capacitor C2. These components establish a DC operating point for the circuit of about 2.2 volts.

(4) The peak voltage detector includes resistors R10 and R11, capacitors C3 and C5, and transistors Q2, Q3, Q4, and Q5. This circuit measures the peak voltage which appears at the input leads +I and −I (after the signals have been attenuated by the compensation network). This peak voltage is then used to set the threshold point for the comparator stage. The peak voltage appears at TP9.

(5) A threshold voltage divider includes resistors R12, R13, and R14. This network takes the peak voltage developed and divides it by two.

(6) The comparator circuit includes resistors R15 and R16, and transistors Q6, Q7, and Q8. This circuit compares each of the inputs on leads +I and −I (after they have been attenuated) with the threshold voltage (one-half of the peak input voltage). If either of the inputs exceeds the threshold voltage, the comparator will sink current through the base of transistor Q9, causing its output to go high. If both inputs are below the threshold voltage, the output stage transistor Q9 will be turned off.

(7) Output stage including resistor R17, diode CR1, and transistor Q9. This circuit responds to the comparator output, generating a TTL compatible voltage level at the output lead.

The input impedance control operates in the following manner. When the SBY lead is set high by peripheral processor 70, transistors Q1 and Q10 are both turned off, preventing current from flowing through either resistor R1 or R2. In this case the input impedance is primarily determined by the series combination of resistors R5 and R7 which is 3.2K ohms.

When the peripheral processor 70 sets the SBY lead low, both transistors Q1 and Q10 are turned on. Transistor Q1 provides a low impedance path between resistor R2 and +5 volts, while transistor Q10 provides a low impedance path between resistor R1 and ground. In this case, it appears that the series combination of resistors R1 and R2 is placed in parallel across the input leads +I and −I, reducing the input impedance to about 600 ohms.

The compensation network functions as follows. Resistors R3 and R7 form a voltage divider for the signal at input lead +I, while resistors R4 and R5 form a voltage divider for the signal at input lead −I. These dividers reduce the input voltage to about 0.25 the value which appears at the +I and −I leads. The capacitors C1, C4, and C6 form a capacitive voltage divider. These values were chosen in combination with the Miller capacitance of the transistors Q4, Q5, Q7, and Q8 and the values of resistors R3, R4, R5, and R7. As a result, the input waveform at +I and −I leads will be attenuated, but not significantly distored. Without these capacitors, the Miller capacitance at the inputs of these transistors causes the attenuator output to be greatly distorted and the circuit functions improperly.

The bias generator is a voltage divider formed by resistors R8 and R9. The capacitor C2 filters the bias voltage to reduce any undesired noise. The values of resistors R8 and R9 have been chosen so that the bias voltage present at their junction will be approximately 2.2 volts.

The peak voltage detector operates in the following manner. The peak voltage itself is developed across capacitor C3 and appears at TP9. This peak voltage is present at the base of transistor Q2 and sets the bias at TP5 to be the peak voltage minus the base-emitter drop of transistor Q2. If either input +I or −I (after attenuation) exceeds the peak voltage, then transistors Q4 or Q5 will begin to conduct. This will increase the voltage at TP5, turning off transistor Q2. When transistor Q2 is turned off, current flows through resistor R11 into the base of transistor Q3, turning on transistor Q3. Transistor Q3 then increases the charge on capacitor C3 until the voltage at the base of transistor Q2 slightly exceeds the input voltage at the base of either transistor Q4 or Q5. This causes transistors Q4 and Q5 to stop conducting. With transistor Q2 conducting once more, the current which was flowing through the base of transistor Q3 is now conducted back through transistor Q2. This turns transistor Q3 off and stops the charging of capacitor C3. The net result is that capacitor C3 has now been charged up to a value, which is equal to the new peak value present at the input.

The threshold voltage is determined by resistors R12 through R14 in the following manner. Resistor R12 together with the parallel combination of resistors R13 and R14 form a voltage divider. These resistors are trimmed so that one-half of any voltage change appearing at the peak voltage detector output TP9 will occur at the base of transistor Q6. As the input signal level changes, the threshold voltage changes proportionally, always remaining at one-half the value of the peak input signal level.

The comparator and output stages function as follows. In case 1, the input voltage at the base of transistors Q7 and Q8 is less than the threshold voltage at the base of transistor Q6. Therefore, current flows through transistor Q6, keeping the voltage at the emitters of transistors Q7 and Q8 equal to the threshold voltage minus the base-emitter drop of transistor Q6. Since the voltage at the base of transistors Q7 and Q8 is less than the threshold voltage, neither transistors Q7 nor Q8 will conduct. This allows resistor R16 to pull up the voltage at TP8 to +5 volts. As a result, transistor Q9 will not conduct, causing resistor R17 to pull the output down to ground.

Now for case 2, when the input voltage at the base of transistors Q7 or Q8 exceeds the threshold voltage, transistors Q7 or Q8 will begin to conduct. Either of transistors Q7 or Q8 which is conducting will draw current through the base of the output transistor Q9, turning on transistor Q9. Transistor Q9 will source current, causing the output voltage to increase to a logic "1" level. When the output exceeds the voltage at TP1, diode CR1 will begin to conduct, increasing the voltage at TP1. As this voltage increases, the amount of current conducted by transistors Q7 or Q8 will decrease, reducing the base drive current through transistor Q9 and preventing the output voltage from rising any further. In effect this provides a negative feedback path which clamps the output voltage, preventing transistor Q9 from becoming saturated. This is important because should transistor Q9 become saturated, its turn off time greatly increases. As a result, transistor Q9 would be unable to respond to rapid changes in the input signal.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a telecommunications switching system, a conversion circuit arrangement connected between a plurality of digital spans and a switching network of said switching system for converting received data from said digital spans, said conversion circuit arrangement comprising:

said conversion circuit arrangement including first and second conversion circuit copies, said first and second copies operated to convert digital span data to data compatible with said switching network;

each digital span of said plurality being connected to a first and second copy of one particular conversion circuit;

CPU means connected to each of said first and second copies of said conversion circuit, said CPU means operated to selectively enable said first copy of said conversion circuit to receive data from said connected digital span or said CPU means alternatively operated to selectively enable said second copy of said conversion circuit to receive data from said connected digital span;

said CPU means operated to initially select said first or said second copy of said conversion circuit for receiving data as an active copy and said CPU means further operated to instantaneously select a standby copy of said conversion circuit for detection of a fault of said active copy of said conversion circuit preventing switching network service interruption;

transformer means including first and second copies, said first and second copies of said transformer means connected in parallel to a particular digital span;

said first copy of said transformer means being connected to said first copy of said conversion circuit;

said second copy of said transformer means being connected to said second copy of said conversion circuit;

said first and second copies of said conversion circuit respectively connected to first and second copies of said switching network;

impedance control means connected to said CPU means and operated in response to a first signal of said CPU means to select a first impedance value of said conversion circuit copy for a first value of said first signal or alternatively to select a second impedance value of said circuit for a second value of said first signal;

voltage detection means connected to a corresponding copy of said transformer means and to said impedance control means, said voltage detection means being operated in response to said digital span data to produce a second signal representing a peak amplitude of said digital span data;

voltage divider means connected to said voltage detection means and operated in response to said second signal to produce a third signal representing approximately one-half the amplitude of said second signal; and comparator means connected to said corresponding copy of said transformer means and to said voltage divider means, said comparator means being operated in response to said digital span data and to said third signal to produce an output signal for said digital span data having an amplitude in excess of said amplitude of said third signal, said output signal being said data compatible with said switching network.

2. A conversion circuit arrangement as claimed in claim 1, each said conversion circuit copy further including compensation network means connected to said particular digital span via said transformer means for attenuating said digital span data to prevent overdrive of said voltage detection means and said comparator means.

3. A conversion circuit arrangement as claimed in claim 2, each said conversion circuit copy further including bias network means connected between said compensation network means and said voltage detection means, said bias network means operated to establish a particular DC operating voltage for said compensation circuit.

4. A conversion circuit arrangement as claimed in claim 3, each said conversion circuit copy further including output means connected between said comparator means and said switching network, said output means operated in response to said comparator means to produce said output signal compatible with said switching network.

5. A conversion circuit arrangement as claimed in claim 1, wherein each said conversion circuit copy is a thick film hybrid.

6. A conversion circuit arrangement as claimed in claim 1, said impedance control means including:

said transformer means being connected to said compensation network means via a positive input lead, a negative input lead and a center tap lead which provide three input signals respectively, a positive signal, a negative signal and a center tap signal;

seventh current control means connected to said CPU and to said corresponding transformer means copy via said negative input lead; and eighth current control means connected to said CPU means and to said corresponding transformer means via said positive input lead.

7. A conversion circuit arrangement as claimed in claim 6, said voltage detection means including:
first current control means connected to said corresponding transformer means copy via said positive input lead and to said compensation network means;
second current control means connected to said corresponding transformer means copy via said negative input lead and to said compensation network means;
third current control means connected to said first and said second current control means; and
fourth current control means connected to said third current control means and to said voltage divider means.

8. A conversion circuit arrangement as claimed in claim 7, said voltage divider means including a resistive network connected between said third and fourth current control means and said comparator means.

9. A conversion circuit arrangement as claimed in claim 8, said voltage detection means further including a first capacitor connected to said third and fourth current control means and to said resistive network.

10. A conversion circuit arrangement as claimed in claim 9, said comparator comprising:
fifth current control means connected to said resistive network;
sixth current control means connected between said fifth current control means and said output means, said sixth current control means further connected to said corresponding transformer means copy via said positive input lead and said negative input lead.

11. A conversion circuit arrangement as claimed in claim 10, said sixth current control means including:
first transistor means having a base, emitter and collector inputs connected to said fifth current control means and being connected to said transformer via said positive input lead and connected to said compensation network means via said base input; and
second transistor means having a base-emitter and collector inputs and being connected via said base input to said transformer via said negative input lead and being connected to said compensation network means, said first and second transistor means being further connected to each other at their collector inputs and at their emitter inputs.

12. A conversion circuit arrangement as claimed in claim 11, wherein said compensation network means including:
first resistor-capacitor network connected between said corresponding transformer means copy via said positive input lead and said first current control means and said first transistor means;
second resistor-capacitor network connected between said corresponding transformer means copy via said negative input lead and said second current control means and said second transistor means;
a second capacitor connected between said positive input lead and said negative input lead of said corresponding transformer means copy;
a first resistor connected between said center tap lead and said positive input lead of said corresponding transformer means copy; and
a second resistor connected between said center tap lead and said negative input lead of said corresponding transformer means copy.

13. A conversion circuit arrangement as claimed in claim 12, said biased network means including a series connection of third and fourth resistors having their common connection connected to said transformer via said center tap lead, said third and fourth resistors being connected to each of said current control means.

14. A conversion circuit arrangement as claimed in claim 13, said output means including:
third transistor means having base, emitter and collector inputs, said base input being connected to said first and second transistor means and providing said output signal at the collector of said third transistor means; and
diode means including a diode having an anode and a cathode, said anode connected to said emitter inputs of said first and second transistor means, said cathode connected to said collector input of said third transistor means, said diode means operated in response to said data of said second coding to provide a rapid transition of said output signal from a logic "1" state to a logic "0" state.

* * * * *